United States Patent [19]
Eads et al.

[11] Patent Number: 4,655,494
[45] Date of Patent: Apr. 7, 1987

[54] PLASTIC GRAIN SCOOP

[75] Inventors: Harold O. Eads, Parkersburg; Rudolph F. Planthaber, Mineral Wells, both of W. Va.

[73] Assignee: O. Ames Co., Parkersburg, W. Va.

[21] Appl. No.: 891,049

[22] Filed: Jul. 30, 1986

Related U.S. Application Data

[63] Continuation of Ser. No. 754,084, Jul. 12, 1985, abandoned.

[51] Int. Cl.$^4$ ............................................. A01B 1/02
[52] U.S. Cl. ................................................. 294/49
[58] Field of Search ............... 294/49, 54.5, 55, 57; D8/10; 37/265, 285; 76/113; 209/418, 419

[56] References Cited

U.S. PATENT DOCUMENTS

| D. 267,468 | 1/1983 | Simms | D8/10 |
|---|---|---|---|
| 1,374,336 | 4/1921 | Surbaugh | 294/57 X |
| 1,512,720 | 10/1924 | Surbaugh | 294/49 |
| 1,714,592 | 5/1929 | Denning | 294/49 |
| 4,149,744 | 4/1979 | Bonnes | 294/54.5 |
| 4,280,727 | 7/1981 | Germain | 294/54.5 |

FOREIGN PATENT DOCUMENTS

| 234664 | 6/1925 | United Kingdom | 294/49 |
|---|---|---|---|
| 2063142 | 6/1981 | United Kingdom | 294/49 |

*Primary Examiner*—Johnny D. Cherry
*Attorney, Agent, or Firm*—Cushman, Darby & Cushman

[57] ABSTRACT

A grain scoop molded of a plastic material to provide a socket portion open at its rearward end for the reception of the forward end of an elongated handle therein and a scoop portion integral with the socket portion which extends laterally outwardly and forwardly with respect thereto. The scoop portion is formed by a central corrugation and bottom wall portions on opposite sides thereof each having a coextensive corrugation therein. The scoop portion is defined peripherally by a straight front edge and peripheral edges extending between the front end of the socket portion and the ends of the front edges which are disposed generally in a plane intersecting with the longitudinal extent of the socket portion at an angle of the order of 20° and with the plane of the forward sections of the bottom wall portions at an angle of the order of 16½°. The corrugations having strengthening ribs therein.

12 Claims, 6 Drawing Figures

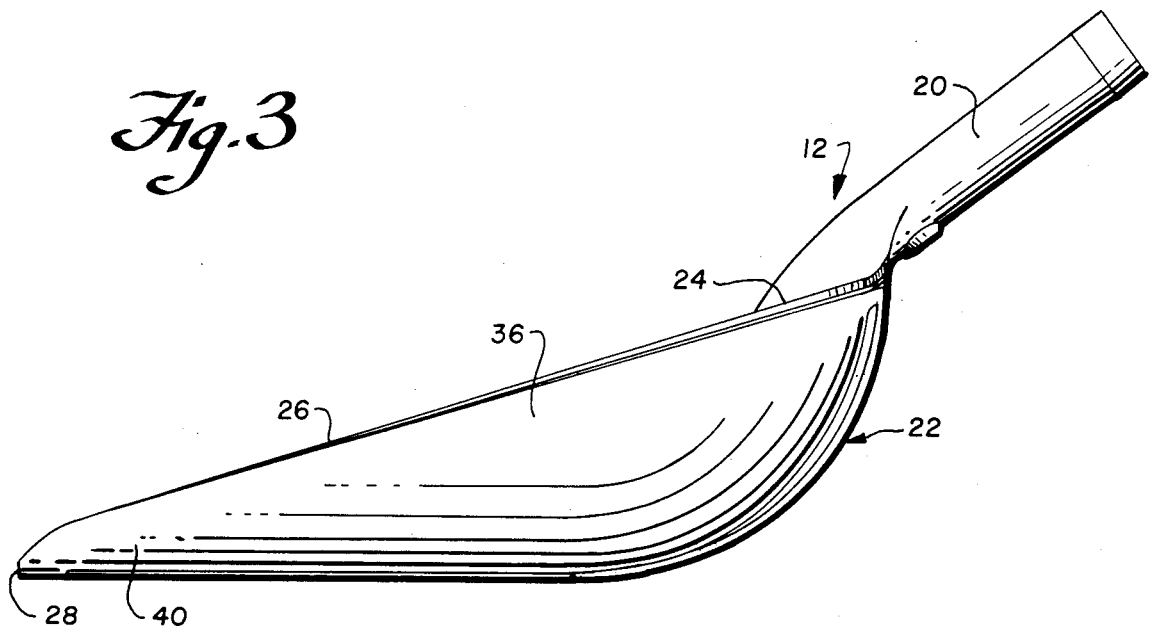
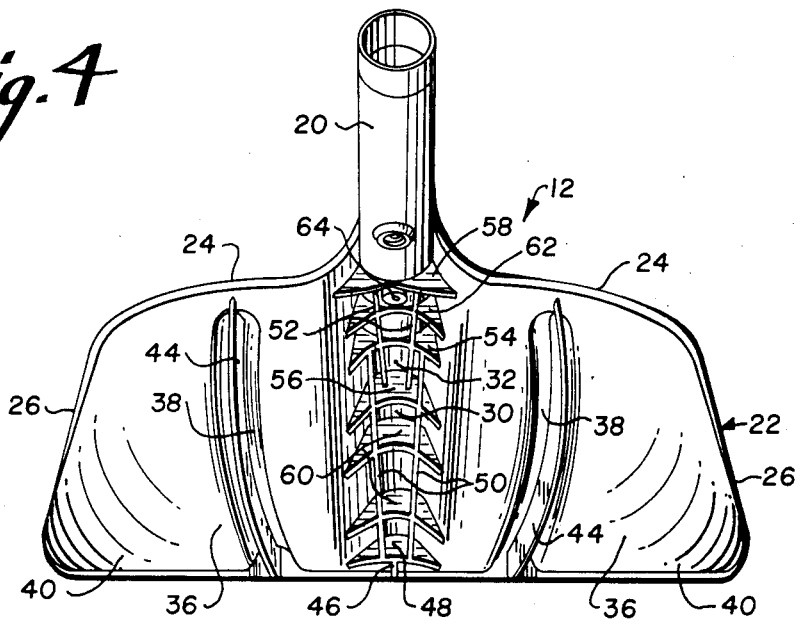

PLASTIC GRAIN SCOOP

This is a continuation of application Ser. No. 754,084, filed July 12, 1985, which was abandoned upon the filing hereof.

This invention relates to hand held shovels and more particularly to shovels of the grain scoop type.

Grain scoops have been available on the market for many years. Basically the units which are presently available on the market are units which are fabricated from a metal material. The object of the present invention is to provide a grain scoop which can be molded of a suitable thermo plastic resinous material so as to provide the strength and capacity heretofore provided by grain scoops formed of a metallic material.

In accordance with the principles of the present invention, this objective is obtained by providing a grain scoop comprising a molded plastic body which includes an elongated socket portion open at its rearward end for the reception of the forward end of an elongated handle therein and a scoop portion integral with the socket portion which extends laterally outwardly and forwardly with respect thereto. The scoop portion includes scoop defining peripheral edges having rearward sections extending outwardly from opposite sides of the socket portion at positions near the forward end thereof and curving outwardly and forwardly and forward sections extending forwardly from the rearward sections in slightly diverging relation with respect to one another. The peripheral edges are disposed generally in a single plane which intersects with the elongated extent of the socket portion at an angle of the order of 20°. The scoop portion provides a generally straight forward edge extending between the forward ends of the peripheral edges so as to define therewith and with the intervening socket portion the entire periphery of the scoop portion. The scoop portion further provides a central longitudinal corrugation of inverted U-shaped cross-sectional configuration having a rearward section extending downwardly and forwardly from the upper forward section of the socket portion and a forward section extending along a generally straight path which merges rearwardly with a smooth curving transition with the rearward section. The scoop portion also includes bottom wall portions extending rearwardly from the forward edge and outwardly from opposite sides of the central corrugation, then upwardly to the peripheral edges. Each of the bottom wall portions has an outer longitudinal corrugation formed therein of inverted U-shaped cross-sectional configuration in generally coextensive relation to the central corrugation. The bottom wall portions also include forward sections disposed generally in a plane extending at an angle of the order of 16½° with respect to the plane of the peripheral edges and generally concave rearward sections bulging downwardly from the rearward sections of the peripheral edges and on opposite sides of the rearward section of the central corrugation and the forward section of the socket portion. The central corrugation has strengthening ribs extending within the U-shaped cross-sectional configuration thereof.

Another object of the present invention is the provision of a grain scoop molded of plastic material which is simple in construction, effective in operation and economical to manufacture.

These and other objects of the present invention will become more apparent during the course of the following detailed description and appended claims.

In the drawings:

FIG. 3 is a side elevational view of the grain scoop shown in FIG. 1;

FIG. 4 is a rear elevational view of the grain scoop shown in FIG. 1;

Figure 1:
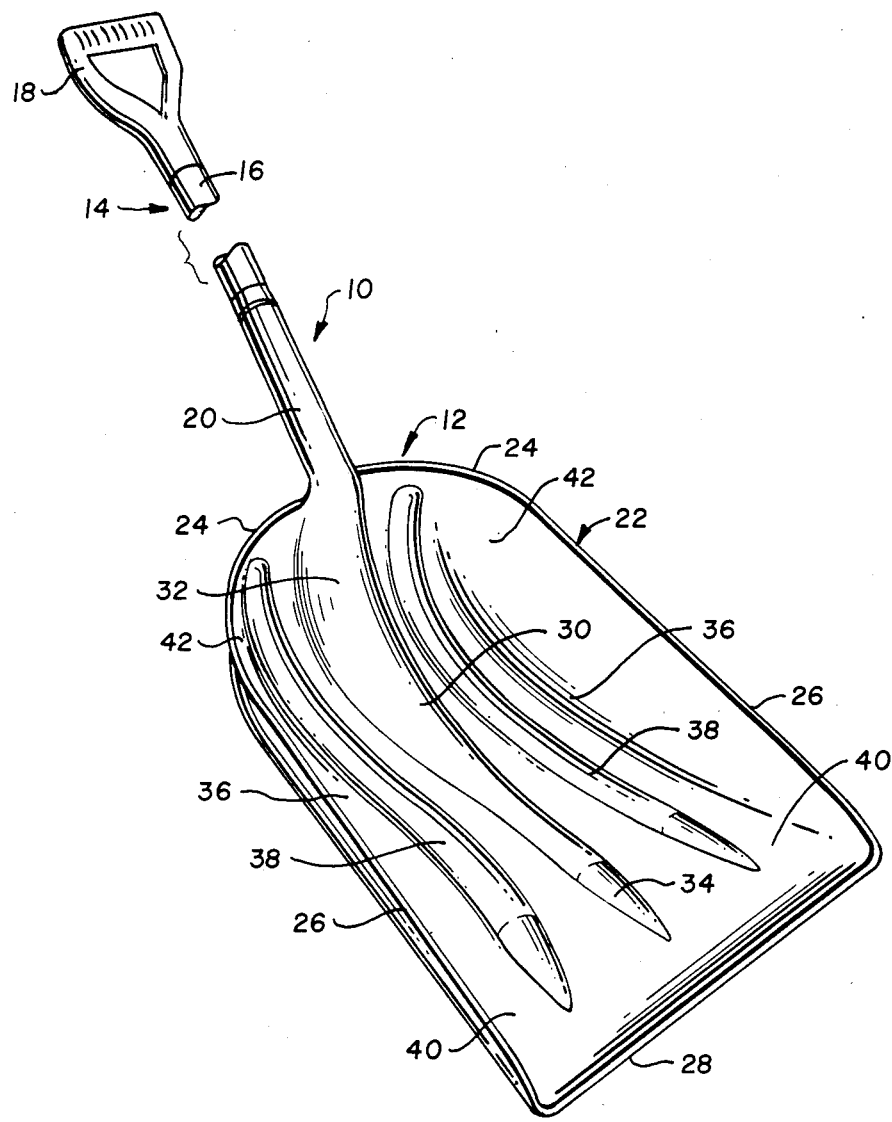
FIG. 1 is a prospective view of a grain scoop embodying the principles of the present invention showing the same in assembled relation with a D type handle structure.
Figure 2:
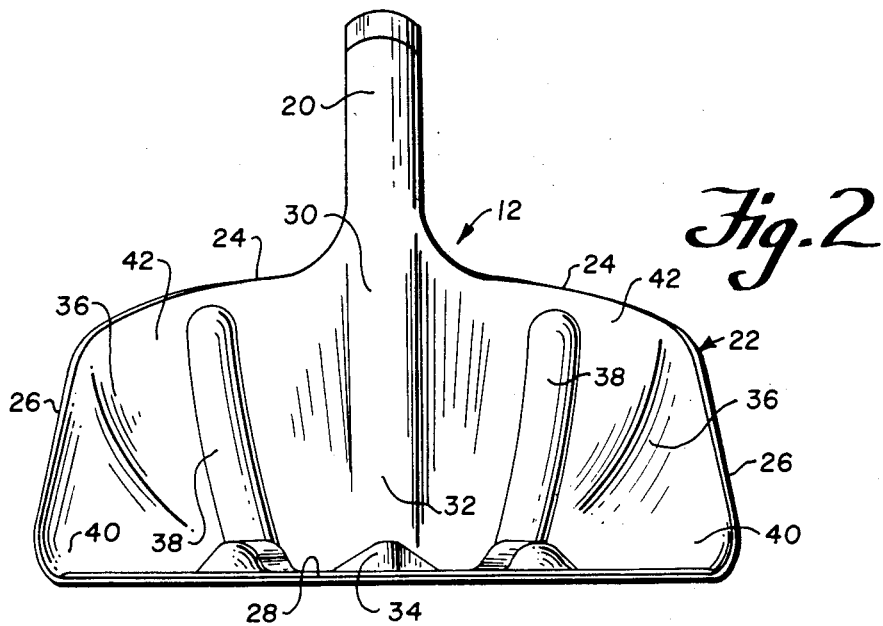
FIG. 2 is a front elevational view of the grain scoop shown in FIG. 1.

Referring now more particularly to the drawings, there is shown in FIG. 1 thereof a grain scoop and handle assembly, generally indicated at 10. The assembly 10 includes a grain scoop, generally indicated at 12, which comprises a one piece body of molded plastic material and a handle structure, generally indicated at 14 which, as shown is preferably of the D type. The D type handle structure 14 includes an elongated wooden handle element 16 having a forward end adapted to be secured with the grain scoop and a rearward end having a molded D shaped handle element 18 suitably fixed thereto. It will be understood that other types of handle structures may be utilized instead of the D type shown if desired.

The present invention is more particularly concerned with the construction of the grain scoop 12 and in this regard it will be understood that any suitable plastic material may be utilized in molding the one piece body which constitutes the grain scoop 12. A preferred exemplary material is Cycolac ®.

Referring now more particularly to FIGS. 2 thru 6, the grain scoop 12 includes a socket portion 20 open at its rearward end for the reception of the forward end of the elongated handle element 16 therein and a scoop portion, generally indicated at 22, integral with the socket portion 20 which extends laterally outwardly and forwardly therefrom. The scoop portion 22 includes scoop defining peripheral edges having rearward sections 24 extending outwardly from opposite sides of the socket portion 20 at positions near the forward end thereof and curving outwardly and forwardly. The peripheral edges include forward sections 26 extending forwardly from the rearward sections 24 in slightly diverging relation with respect to one another. As best shown in FIG. 3, the peripheral edges 24 and 26 are disposed generally in a single plane which intersects with the longitudinal extent of the socket portion at an angle of the order of 20°.

Extending between the forward ends of the peripheral edges 26 is a generally straight forward edge construction 28 which defines with the peripheral edges 24 and 26 and with the intervening socket portion 20, the entire periphery of the scoop portion 22.

The scoop portion 22 within its periphery is formed with a central longitudinal corrugation 30 of inverted U-shaped cross-sectional configuration. The corrugation has a rearward section 32 which extends downwardly and forwardly from the upper forward section of the socket portion 20 and a forward section 34 extending along a generally straight path which merges rearwardly with a smooth curving transition with the rear section 32. In addition to the central longitudinal corrugation 30, the scoop portion 22 within its defined periphery also includes a pair of bottom wall portions 36 extending rearwardly from the forward edge 28 and outwardly from opposite sides of the central corrugation 30 and then upwardly to the peripheral edges 24 and 26. Formed longitudinally within each bottom wall portion 36 is an outer longitudinal corrugation 38 of inverted U-shaped cross-sectional configuration. Each of the outer longitudinal corrugations 38 extend in generally coextensive relation with the central corrugation 30.

The bottom wall portions 36 include forward sections 40 which are disposed generally in a plane extending at an angle of the order of 16½° with respect to the plane of the peripheral edges 24 and 26. This angular relationship is best shown in FIG. 3 and it will be noted from this figure that the bottom wall portions 36 also include generally concave rearward sections 42 bulging downwardly from the rearward sections 24 of the peripheral edges and on opposite sides of the rearward section 32 of the central corrugation 30 and the forward section of the socket portion 20.

Figure 6:
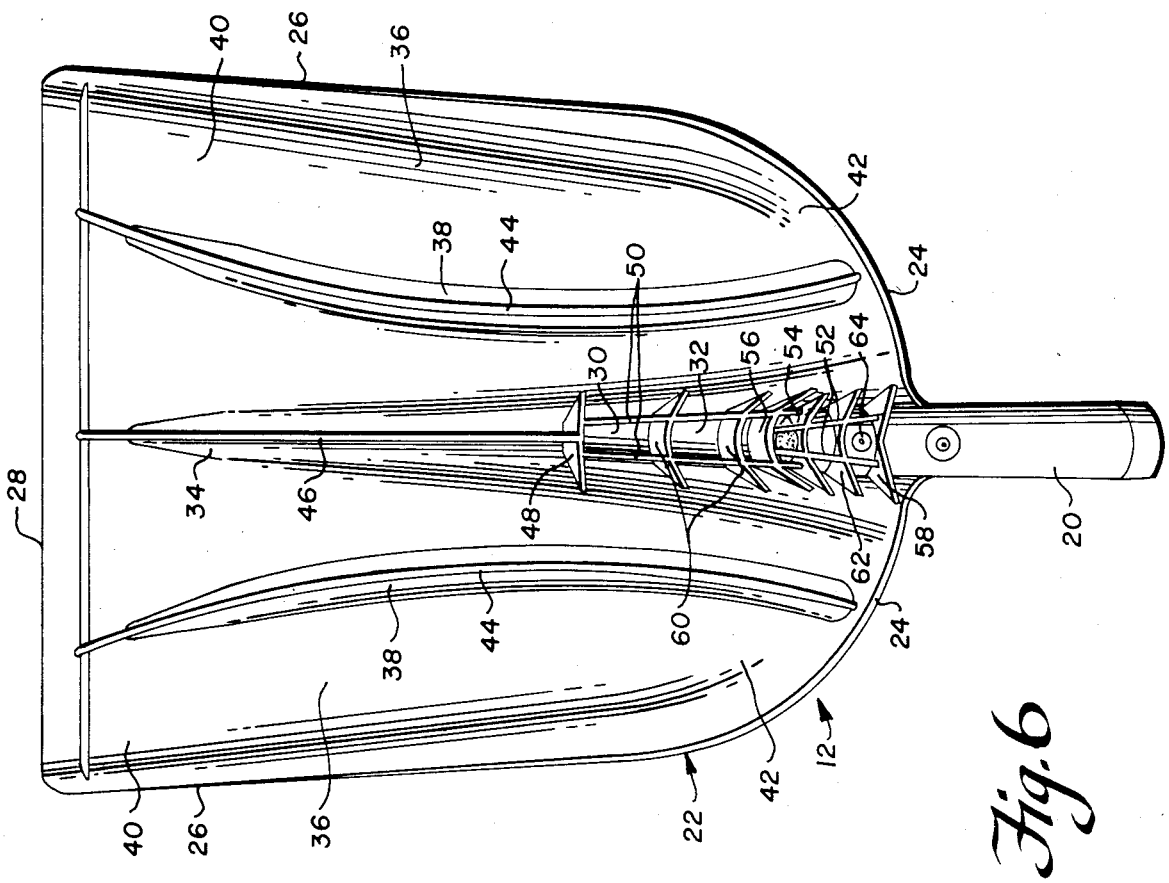
FIG. 6 is a bottom view of the grain scoop shown in FIG. 1.
Figure 5:
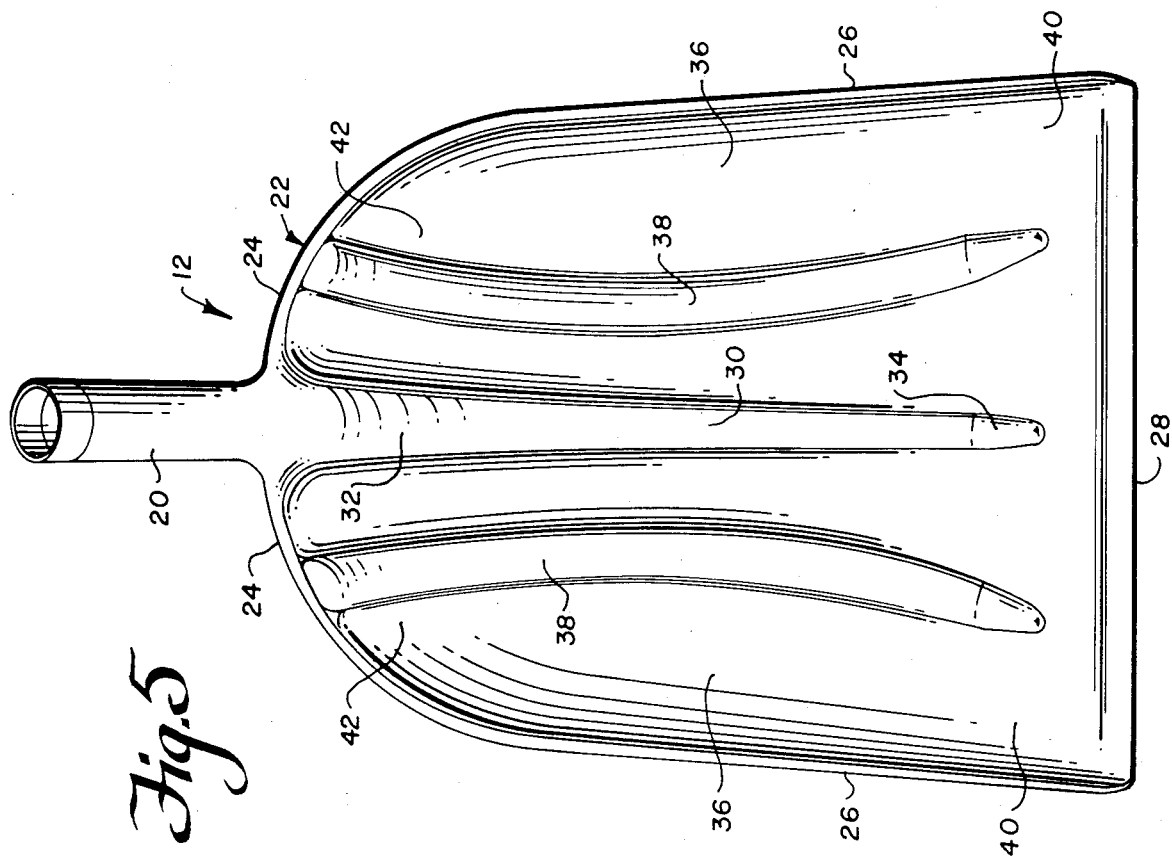
FIG. 5 is a top plan view of the grain scoop shown in FIG. 1.

It will also be noted that strengthening ribs are formed within all three of the corrugations 30 and 38. As best shown in FIGS. 4 and 6, each of the outer corrugations 38 has a longitudinally extending elongated rib 44 formed integrally with the portion thereof defining the bight of the inverted U-shaped cross-sectional configuration of the corrugation. Each elongated rib 44 is disposed in spaced relation between the portions of the associated outer corrugation 38 which define the legs of the inverted U-shaped cross-sectional configuration thereof.

With respect to the strengthening ribs provided in the central corrugation 30, it will be noted that a forward central rib 46 is formed integrally with the portion of the forward section 34 of the central corrugation 30 defining the bight of the inverted U-shaped cross-sectional configuration. This forward central rib 46 is spaced between the portions of the forward section 34 of the central corrugation 30 which define the legs of the inverted U-shaped cross-sectional configuration. As best shown in FIG. 6, the forward central rib 46 extends rearwardly from a position adjacent the forward edge 28 and terminates at a position within the central corrugation 30 wherein there is formed a forward transverse rib 48. The transverse rib 48 is integrally connected with the rear end of the forward central rib 46. Extending rearwardly from the forward transverse rib 48 is a forward pair of longitudinal ribs 50. These ribs are integral with the central corrugation 30 and their forward ends are integral with the forward transverse rib 48. The forward pair of longitudinal ribs 50 extend from their integral connection with the forward transverse rib 48 rearwardly to a position adjacent the forward end of the socket portion 20.

A rearward pair of longitudinal ribs 52 are formed integrally with the rearward section 32 of the central corrugation 30. The rearward pair of longitudinal ribs 52 have their forward ends coextensive with the rearward ends of the forward pair of ribs 50 and extend rearwardly along the sides of the forward section of the socket portion 20. Finally, it will be noted that the rearward ends of the forward pair of ribs 50 is integrally formed with a transverse rib 54 which is also integral with the rearward pair of longitudinal ribs 52. Similarly, both the forward and rearward ends of the rearward pair of ribs 52 are formed integrally with transversely extending ribs 56 and 58, the forward one of the ribs 56 is also integral with the forward pair of longitudinal ribs 50. Between the forward transverse rib 48 and the transverse rib 56 are a series of longitudinally spaced ribs 60. As shown, there are two such transverse ribs 60. Similarly, an intermediate rib 62 is provided between the transverse ribs 54 and 58.

In addition to the above it will be noted that there is formed on the lower forward section of the socket portion a circular boss 64 having a central aperture thereto for the receipt of a fastener which serves to fixedly secure the forward end of the elongated handle element 16 within the socket portion.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A grain scoop comprising a molded plastic body including an elongated socket portion open at its rearward end, and a scoop portion integral with said socket portion and extending laterally outwardly and forwardly therefrom, said socket portion being of closed annular configuration and having a predetermined straight direction of longitudinal extent, an elongated generally straight handle having a forward end portion fixed within the socket portion of said molded plastic body and extending rearwardly therefrom in the direction of the longitudinal extent of said socket portion, said scoop portion including scoop defining peripheral edges having rearward sections extending outwardly from opposite sides of said socket portion at positions near the forward end thereof and curving outwardly and forwardly and forward sections extending forwardly from the rearward sections in slightly diverging relation with respect to one another, said peripheral edges being disposed generally in a single plane which intersects with the elongated extent of said socket portion at an acute angle, said scoop portion providing a generally straight forward edge extending between the forward ends of said peripheral edges so as to define therewith and with the intervening socket portion the entire periphery of said scoop portion, said scoop portion providing a central longitudinal corrugation of inverted U-shaped cross-sectional configuration having a rearward section extending downwardly and forwardly from the upper forward section of said socket portion with respect to the direction of longitudinal extent of said socket portion and a forward section extending upwardly and forwardly with respect to the downward and forward extent of said rearward section and along a generally straight path which merges rearwardly with a smooth curving transition with said rearward section, said scoop portion including bottom wall portions extending rearwardly from said forward edge and outwardly from opposite sides of said central corrugation and then upwardly to said peripheral edges, each of said bottom wall portions having an outer longitudinal corrugation formed therein of inverted U-shaped cross-sectional configuration in generally spaced side-by-side relation to said central corrugation, said bottom wall portions including forward sections disposed generally in a plane extending at an acute angle with respect to the plane of said peripheral edges and generally concave rearward sections bulging downwardly from the rearward sections of said peripheral edges and from opposite sides of the rearward section of said central corrugation and the forward section of said socket portion, the angle of the plane of the forward sections of said bottom wall portions with respect to the direction of longitudinal extent of said socket portion and the rearwardly extending handle providing a lift angle when the forward sections of the bottom wall portions are in a horizontal position like that of a metal grain scoop, the angle of the plane of the peripheral edges with respect to the plane of the forward sections of said bottom wall portion and the extent of the bulging downward concavity of the rearward sections of the bottom wall portions providing a grain holding capacity like that of a metal grain scoop, and strengthening ribs extending within the U-shaped cross-sectional configuration of said central corrugation and between the lower forward section of said socket portion and within the adjacent concave rearward sections of said bottom wall portions.

2. A grain scoop as defined in claim 1 wherein each of said outer corrugations has an elongated rib formed integrally with the section thereof defining the bight of the inverted U-shaped cross-sectional configuration, each elongated rib being spaced between the sections of the associated outer corrugation defining the legs of the inverted U-shaped cross-sectional configuration.

3. A grain scoop as defined in claim 2 wherein said strengthening ribs include a forward central rib formed integrally with the portion of the forward section of said central corrugation defining the bight of the inverted U-shaped cross-sectional configuration, said forward central rib being spaced between portions of the forward section of the central corrugation defining the legs of the inverted U-shaped cross-sectional configuration.

4. A grain scoop as defined in claim 3 wherein said strengthening ribs include a forward transverse rib within the central corrugation integrally connected with the rear end of said forward central rib.

5. A grain scoop as defined in claim 4 wherein said strengthening ribs include a forward pair of longitudinal ribs within said central corrugation integral with said forward transverse rib and extending rearwardly thereof to the forward end of said socket portion.

6. A grain scoop as defined in claim 5 wherein said strengthening ribs include a rearward pair of longitudinal ribs having their forward ends coextensive with the rearward ends of said forward pair of ribs and extending rearwardly along the sides of the forward section of said socket portion.

7. A grain scoop as defined in claim 6 wherein said strengthening ribs include a plurality of transverse ribs integral with said forward and rearward pairs of ribs including the rearward ends of said forward pair of ribs and both ends of said rearward pair of ribs.

8. A grain scoop as defined in claim 1 wherein said strengthening ribs include a forward central rib formed integrally with the portion of the forward section of said central corrugation defining the bight of the inverted U-shaped cross-sectional configuration, said forward central rib being spaced between portions of the forward section of the central corrugation defining the legs of the inverted U-shaped cross-sectional configuration.

9. A grain scoop as defined in claim 8 wherein said strengthening ribs include a forward transverse rib within the central corrugation integrally connected with the rear end of said forward central rib.

10. A grain scoop as defined in claim 9 wherein said strengthening ribs include a forward pair of longitudinal ribs within said central corrugation integral with said forward transverse rib and extending rearwardly thereof to the forward end of said socket portion.

11. A grain scoop as defined in claim 10 wherein said strengthening ribs include a rearward pair of longitudinal ribs having their forward ends coextensive with the rearward ends of said forward pair of ribs and extending rearwardly along the sides of the forward section of said socket portion.

12. A grain scoop as defined in claim 11 wherein said strengthening ribs include a plurality of transverse ribs integral with said forward and rearward pairs of ribs including the rearward ends of said forward pair of ribs and both ends of said rearward pair of ribs.

* * * * *